(12) United States Patent
Ferchland et al.

(10) Patent No.: US 8,929,264 B2
(45) Date of Patent: Jan. 6, 2015

(54) TRANSMITTING-RECEIVING APPARATUS

(75) Inventors: Tilo Ferchland, Dresden (DE); Katja Schwieger, Dresden (DE); Joerg Wunsch, Dresden (DE); Dietmar Eggert, Dresden (DE); Leslie J. Mulder, Burnaby (CA); Fred Fierling, Port Coquitlam (CA)

(73) Assignee: Atmel Corporation, San Jose, CA (US)

( * ) Notice: Subject to any disclaimer, the term of this patent is extended or adjusted under 35 U.S.C. 154(b) by 356 days.

(21) Appl. No.: 13/307,417

(22) Filed: Nov. 30, 2011

(65) Prior Publication Data

US 2012/0142281 A1 Jun. 7, 2012

Related U.S. Application Data

(60) Provisional application No. 61/421,356, filed on Dec. 9, 2010.

(30) Foreign Application Priority Data

Dec. 1, 2010 (DE) .......................... 10 2010 052 890

(51) Int. Cl.
*H04W 84/18* (2009.01)
*H04L 12/28* (2006.01)
*H04L 29/06* (2006.01)
*H04L 29/12* (2006.01)

(52) U.S. Cl.
CPC ........... *H04L 65/104* (2013.01); *H04L 61/6022* (2013.01); *H04L 61/6081* (2013.01); *H04L 61/6004* (2013.01)
USPC ............................................. 370/310; 455/73

(58) Field of Classification Search
USPC ....................................... 455/343.1; 370/311
See application file for complete search history.

(56) References Cited

U.S. PATENT DOCUMENTS

| 5,274,631 A * | 12/1993 | Bhardwaj ...................... 370/401 |
| 7,596,365 B2 * | 9/2009 | Ferchland et al. ......... 455/343.1 |
| 2004/0156318 A1 | 8/2004 | Rune |
| 2005/0025080 A1 * | 2/2005 | Liu ............................... 370/311 |

FOREIGN PATENT DOCUMENTS

| DE | 10 2005 049 931 | 9/2009 |
| DE | 10 2008 018 871 | 10/2010 |

OTHER PUBLICATIONS

"Part 15.4: Wireless Medium Access Control (MAC) and Physical Layer (PHY) Specifications for Low-Rate Wireless Personal Area Networks (WPANs)," *IEEE Std 802.15.4™—2006*, Sep. 8, 2006.

(Continued)

*Primary Examiner* — Kevin C Harper
*Assistant Examiner* — Derrick V Rose
(74) *Attorney, Agent, or Firm* — Fish & Richardson P.C.

(57) ABSTRACT

In one embodiment, receiving a first radio frequency (RF) signal from a first node, generating a first digital data set by decoding the first received RF signal, determining whether a first address in the first digital data set is associated with at least one of a first radio network or a second radio network by comparing the first address to a first set of addresses associated with the first radio network and a second set of addresses associated with the second radio network, appending a first status to the first digital data set indicating that the first address is associated with the first or second radio network, and transmitting an interrupt signal and the first digital data set to a microcontroller for evaluation by the microcontroller in response to determining that the first address is associated with at least one of the first or second radio network.

20 Claims, 4 Drawing Sheets

(56) References Cited

OTHER PUBLICATIONS

"Part 15.2: Coexistence of Wireless Personal Area Networks with Other Wireless Devices Operating in Unlicensed Frequency Bands," *IEEE Std 802.15.4™—2003*, Aug. 28, 2003.

"Part 15.1: Wireless medium access control (MAC) and physical layer (PHY) specifications for wireless personal area networks (WPANs)," *IEEE Standard 802.15.1™* 2005, Jun. 14, 2005.

Office Action and English translation for German Patent Application 10 2010 052 890.0, Jun. 25, 2012.

* cited by examiner

TRANSMITTING-RECEIVING APPARATUS

RELATED APPLICATIONS

This application claims the benefit, under 35 U.S.C. §119 (e), of U.S. Provisional Patent Application No. 61/421,356, entitled "Transmitting-Receiving Apparatus and Method for Reception," filed 9 Dec. 2010. This application also claims the benefit, under 35 U.S.C. §119(a), of German Patent Application No. 102010052890.0-31, entitled "Sende-Empfangs-Vorrichtung and Verfahren zum Empfang," filed 1 Dec. 2010.

TECHNICAL FIELD

This disclosure relates to a transceiver.

BACKGROUND

A transceiver is a device that has both a transmitter and a receiver that are combined and may share common circuitry or a single housing.

DESCRIPTION OF EXAMPLE EMBODIMENTS

This disclosure relates to a transmitting-receiving apparatus and a method for reception.

This disclosure relates to data transmission. Although they may in principle be used in any digital communication systems for bidirectional data transmission, this disclosure as well as the problems at its base are explained in the following using an "ZigBee" communication system in accordance with the industry standard Institute of Electrical and Electronics Engineers (IEEE) 802.15.4 Wireless Medium Access Control (MAC) and Physical Layer (PHY) Specifications for Low-Rate Wireless Personal Area Networks (WPANs).

So-called WPANs may be used as radio networks for the wireless transmission of information over relatively short distances, such as about 10 m. In contrast to Wireless Local Area Networks (WLANs), WPANs require little or even no infrastructure for data transmission, so that small, simple, energy-efficient and economical devices may be produced for a broad area of applications. A node is assigned to a wireless network by a device, for example, a wireless network address associated with this wireless network is stored in the node.

U.S. Pat. No. 7,596,365, which claims priority to German Patent Application No. DE 10 2005 049 931 B4, describes a transmitting-receiving apparatus that comprises a transmitting-receiving unit for transmitting and receiving data in accordance with the industry standard IEEE 802.15.4 and comprises an arithmetic unit for controlling the transmitting-receiving unit so that the energy requirement of the total transmitting-receiving apparatus results from that of the transmitting-receiving unit plus that of the arithmetic unit.

In particular embodiments, the transmitting-receiving unit perceives the functionalities specified on the plane of the physical (PHY) layer of the standard IEEE 802.15.4 while the arithmetic unit assumes those of the MAC layer and, if necessary, of higher layers. The PHY functionalities include here, for example, the transmitting and receiving of PHY data frames, or PHY protocol data unit (PPDU), over the physical channel (modulation/demodulation, synchronization, etc.) as well as the checking of the channel loading, or clear channel assessment (CCA). Methods for increasing the robustness of the data transmission, such as the acknowledgment of successfully received PHY data frames by acknowledgment (ACK) frames, the further procedure in the case of failed transmission attempts, or anti-collision methods such as Carrier Sense Multiple Access with Collision Avoidance (CSMA-CA) is specified on the MAC plane. In U.S. Pat. No. 7,596,365, a control unit of the transmitting-receiving unit determines whether the received data frame contains an ACK message, where the data frame is not forwarded to the arithmetic unit if it contains the ACK message.

German Patent Application No. DE 10 2008 018 871 B4 describes a receiver circuit and a method for receiving a signal received via an antenna of a node of a radio network. A current frame is determined from the received signal in accordance with the industry standard IEEE 802.15.4 with digital data and is stored. The stored digital data of the current frame is checked. The digital data of the current frame is transmitted to an arithmetic unit if the current frame with the digital data was recognized as valid. An analog signal processing and the determination of a following frame are deactivated if the current frame with the digital data was recognized as valid. Subsequently, the analog signal processing and the determination of a following frame is reactivated when the current frame is loaded into the arithmetic unit. For checking, an address contained in the current frame is compared with an identification of the node, and the determination of a following frame is only deactivated if an identity of the address and of the identification is determined.

Particular embodiments provide energy efficient and flexible reception in a radio network without requiring several receiving circuits for one node.

Particular embodiments provide a transmitting-receiving apparatus for receiving a radio signal. Particular embodiments of the transmitting-receiving apparatus may be used in a node in radio networks. In particular embodiments, the radio signal may conform with the IEEE 802.15.4 industry standard. In particular embodiments, each radio network may have an address associated with the radio network.

In particular embodiments, the transmitting-receiving apparatus may be adjusted for generating digital data from the radio signal. In particular embodiments, the data may be outputted as a data stream on an output of a decoder of the transmitting-receiving apparatus.

In particular embodiments, the transmitting-receiving apparatus comprises an address filter unit. The function of the address filter unit is to find out whether an address for the transmitting-receiving apparatus contained in the data is associated. If the address for the transmitting-receiving apparatus contained in the data is not associated, the data may be rejected. If the address for the transmitting-receiving apparatus contained in the data is associated, an evaluation of the data may take place by an arithmetic unit of the transmitting-receiving apparatus.

In particular embodiments, the address filter unit has an input. The data generated by decoding from the received radio signal is on the input. The input of the address filter unit is connected, for example, to the output of the decoder. In particular embodiments, the data may be present as a data stream. A sequence within the data is given, in particular, by a frame structure. The frame structure is determined, for example, in the industry standard IEEE 802.15.4.

In particular embodiments, the address filter unit comprises at least one first address filter and one second address filter. The first address filter may be adjusted for comparing the address contained in the data with a first comparison address. The address contained in the data may have several address fields. The first comparison address may be associated with a first radio network. In particular embodiments, the first comparison address may be settable, in particular programmable, by a register value in the address filter unit. The second address filter may be adjusted for comparing the address contained in the data with a second comparison address. The second comparison address may be associated with a second radio network. The second comparison address may be settable, in particular programmable by a register value in the address filter unit.

In particular embodiments, the address filters may be adjusted for a direct comparison of the data with the particular comparison address. A byte of the data may be compared sequentially with a comparison byte of the comparison address. Alternatively, a bit-wise comparison is also possible. For this, each address filter may be comprised of a digital comparator. Particular embodiments provide further address filters over the first address filter and the second address filter for an isochronous parallel comparison with further comparison addresses.

The transmitting-receiving apparatus may communicate in two different radio networks in the radio range by the comparison with two comparison addresses. To this end, a first input of the first address filter and a second input of the second address filter may be connected to the input of the address filter unit. Thus, the same data may be isochronously present on both inputs of the address filters. By means of the connection, the first address filter and the second address filter may be adjusted for an isochronous comparison of the address contained in the data with the first comparison address and with the second comparison address. In particular embodiments, a serial comparison, that is, a successive comparison in time by the first address filter and thereafter by the second address filter, is not necessary.

In particular embodiments, the transmitting-receiving apparatus comprises a status unit. The status unit may be connected to the outputs of the first address filter and of the second address filter. Thus, the comparison results of the address filters are present on the input of the status unit. The status unit is adjusted for outputting a status signal generated using the comparison by the first address filter and by the second address filter. Thus, the status signal may contain information about whether and which comparison address agreed during the comparison by the address filters with the address contained in data. It is implicitly contained in the status signal that is transmitted to the arithmetic unit, with which radio network the present data is associated. The status unit and the address filter unit may be functionally connected. The status unit may be constructed separately from the address filter unit. In particular embodiments, the status unit together with the address filter unit may form a circuit block.

This disclosure is directed to evaluating data of a received radio signal by an address comparison with address filters of the transmitting-receiving apparatus and associating this data with one of several radio networks before the data is forwarded to an arithmetic unit for further evaluation. The transmitting-receiving apparatus may therefore be configured for two or more radio networks so that the transmitting-receiving apparatus may communicate with nodes of the configurable radio networks. The status signal may be used here to compress the result of the comparison so that no additional evaluation of the addresses by the arithmetic unit has to take place.

Figure 2:
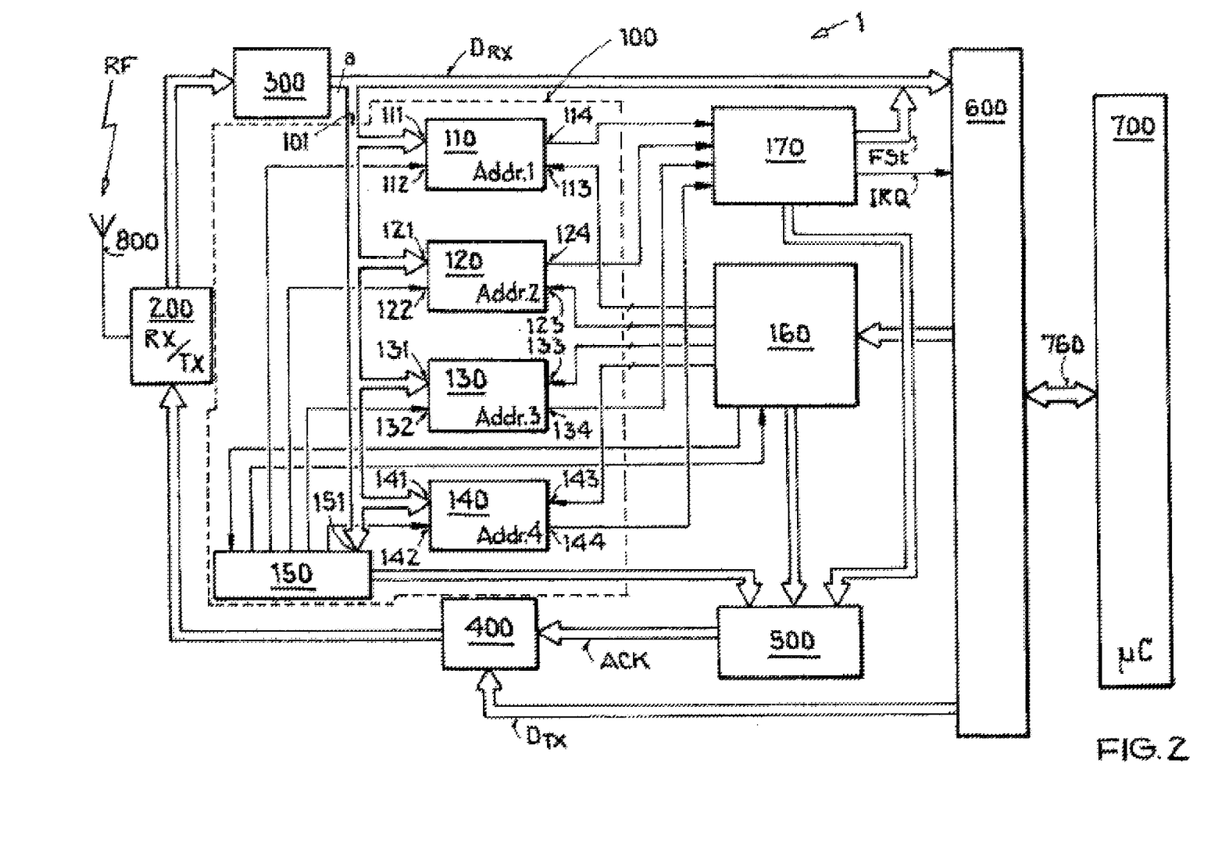
FIG. 2 shows an example schematic block diagram of a transmitting-receiving apparatus.

Several address configurations may be simultaneously processed and evaluated during the receiving process by the management, configuration, and activation of several addresses, as well as of the separate configuration, in particular, of the coordinator function or of the waiting data function as is shown, for example, in the example embodiment of FIG. 2. The result of the evaluation is subsequently made available for the higher protocol layers in the Open Systems Interconnection model (OSI model), where the higher protocol layers may implemented in the arithmetic unit, such as in a microcontroller.

FIG. 2 shows an example schematic block diagram of a transmitting-receiving apparatus. The software management and the memory requirement in the arithmetic unit (microcontroller) are significantly reduced in that the arithmetic unit is freed of functions that are taken over by the address filter unit. Likewise, a separate transmitting-receiving apparatus is not required for each radio network and also no separate high frequency (HF) circuits are required, so that the expense for producing them may be significantly reduced. A simpler and automatic processing of the incoming data of the radio signal is possible with the example embodiment of FIG. 2. In addition, the transmitting-receiving apparatus may carry out the function of a so-called gateway, that is, a place of junction between two radio networks by the communication with two radio networks. Thus, the radio networks and their configuration may be designed with greater flexibility. In particular embodiments, for example, more than 254 nodes may communicate with each other via the gateway function.

Particular embodiments comprise a method for improved reception within radio networks.

Particular embodiments provide a method for reception within radio networks.

In particular embodiments, data is generated by decoding from a received radio signal. The radio signal may be transmitted from a node of a first radio network or from a node of a second radio network.

In particular embodiments, an address contained in the data is compared with a first comparison address. In addition, the address contained in the data is compared with a second comparison address. The comparison may take place serially by an arithmetic unit, such as a microcontroller. The comparison of the address contained in the data with the first and second comparison addresses may take place isochronously, for example, by two address filters.

Based on the comparison of the address contained in the data with the first comparison address and with the second comparison address, a status signal is generated. The status signal may be evaluated by an arithmetic unit or stored.

The first comparison address is associated with a first radio network and the second comparison address is associated with a second radio network different than the first radio network. In particular embodiments, frames of the first radio network as well as of the second radio network are received by means of this association.

In particular embodiments, data is also generated by decoding from a received radio signal by a transmitting-receiving apparatus.

In particular embodiments, an address contained in the data is compared with a first comparison address by the transmitting-receiving apparatus. In addition, the address contained in the data is compared with a second comparison address by the transmitting-receiving apparatus. The comparison may take place serially by an arithmetic unit such as, for example, a microcontroller. The comparison of the address contained in the data with the first and the second comparison address may take place isochronously, for example, by two address filters.

A status signal is produced by the transmitting-receiving apparatus based on the comparison of the address contained in the data with the first comparison address and with the second comparison address.

The first comparison address is associated with a first protocol and the second comparison address is associated with a second protocol different from the first protocol. Both protocols may be used in precisely one radio network, such as a first radio network. A protocol, also designated as network protocol or transmission protocol, is an exact agreement according to which information is exchanged between nodes of the radio network. The agreement consists of syntax that determines the communication by means of the communicating instances in arithmetic units of the nodes. In particular embodiments, for example, if the International Organization for Standardization-OSI (ISO-OSI) reference model is used, where the individual protocols are organized in layers.

In particular embodiments, the first protocol and the second protocol differ by different functions in at least one layer, in layers that are higher in comparison to the MAC layer, such as the switching layer, transport layer, session layer, presentation layer, or application layer. The layers, for example both application layers, may operate with different protocols Prot1, Prot2, independently of one another. The MAC layer may also be designated as media access layer in the expanded OSI model. In particular embodiments, for example, the first protocol may be associated with a data transmission rate that is higher in comparison to the second protocol. In another example embodiment, the first protocol differs from the second protocol as regards the data security.

In particular embodiments, frames of the first protocol as well as of the second protocol are received by the same transmitting-receiving apparatus.

Particular embodiments described in the following refer to the transmitting-receiving apparatus as well as to the method for the reception. Functions of the transmitting-receiving apparatus form corresponding method features. Functional features of the transmitting-receiving apparatus may be derived from method features.

In particular embodiments, the address filter unit has a control unit. An input of the control unit may be connected to the input of the address filter unit. A control output may be connected to a first control input of the first address filter and to a second control input of the second address filter. The control unit may be adjusted for controlling the comparison based on a control field of the data.

In particular embodiments, a length of the address and address fields of the address contained in the data may be indicated in the control field of the data, for example, in accordance with the industry standard IEEE 802.15.4. The length and the address fields may vary as a function of the radio network. Using the control field, the control unit may be adjusted for controlling a byte-wise comparison by the address filter, where the bytes to be compared are selected, for example, by a controlled multiplexer.

In particular embodiments, the transmitting-receiving apparatus comprises a configuration register. The configuration register may be connected to a first comparison address input of the first address filter and to a second comparison address input of the second address filter. The first comparison address and the second comparison address may be stored in the configuration register. A data display bit, such as Data Pending bit, additionally associated with each comparison address may be stored, where the data display bit indicates whether data to be sent is present. The configuration register and the first address filter and the second address filter may be adjusted for activating and deactivating the comparison by the first or the second address filter by means of a value in the configuration register, in particular, to cut in and out the first address filter or the second address filter. In particular embodiments, the configuration register may be connected via an interface of the transmitting-receiving apparatus to the arithmetic unit for programming the configuration register. The configuration register and address filter unit may be functionally connected. The configuration register may be constructed separately from the address filter unit. The configuration register may be combined together with other registers of the transmitting-receiving apparatus to a register unit. Alternatively, the configuration register may also be constructed as a component of the address filter unit.

In particular embodiments, the transmitting-receiving apparatus comprises a generator logic that may be connected to the control unit, the status unit, and to the configuration register of the address filter unit. The generator logic may be adjusted for generating an ACK message based on the comparison of the address contained in the data with the first comparison address and the second comparison address. The ACK message may be composed by the generator logic using the data display bit and by a sequence number from the received data which sequence number was determined by the control unit.

In particular embodiments, the transmitting-receiving apparatus comprises an interface for the connection to an arithmetic unit, where the arithmetic unit may be adjusted for evaluating the data. Here, the data is transmitted via the interface to the arithmetic unit. The interface may be connected to the address filter unit.

The address filter unit may be adjusted for carrying out the comparison of the address contained in the data with the first comparison address and the second comparison address independently of the arithmetic unit. Here, the data is not forwarded to the arithmetic unit via the interface until after a positive comparison result.

The status unit may be adjusted for appending the status signal to the data and transmitting it with the data via the interface to the arithmetic unit.

In particular embodiments, the address filter unit is adjusted for outputting an interrupt signal to the arithmetic unit if the address contained in the data agrees with the first comparison address or with the second comparison address. The interrupt signal may be generated by the status unit of the transmitting-receiving apparatus.

The arithmetic unit comprises at least two operating modes with a differently high energy consumption. The arithmetic unit may be adjusted for exiting an energy saving mode with low energy consumption if the arithmetic unit receives the interrupt signal from the status unit.

Particular embodiments are described individually as well as in combination. Particular embodiments may be combined with each other. Particular embodiments are shown in the example embodiment of the figures.

Figure 3:
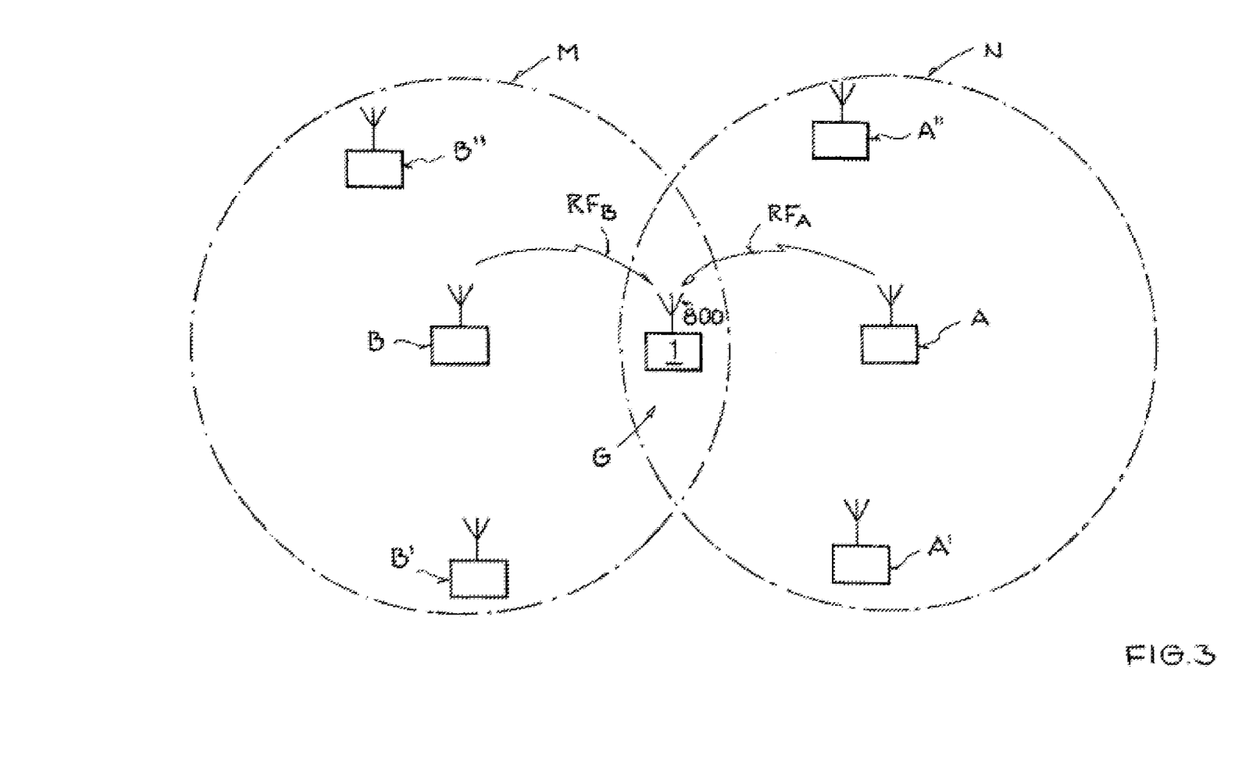
FIG. 3 shows an example schematic representation of two radio networks.

FIG. 3 shows an example of a WPAN data transmission system according to the industry standard IEEE 802.15.4. The WPAN data transmission system comprises a first radio network N with the nodes A, A', A", and G and a second radio network M with the nodes B, B', B", and G. Node G may be associated with the first radio network N as well as with the second radio network M and forms, for example, a so-called gateway (network junction) between the first radio network N and the second radio network M.

The nodes A, A', A", G, B, B', B" are stationary or mobile devices that wirelessly exchange information by means of radio signals. Node A may be a so-called fully functional device that assumes the function of the WPAN coordinator whereas nodes A', A" may be so-called partially functional devices that are associated with a fully functional device (node A) and may exchange data only with it. Node G also may have the function of a fully functional device in first radio network N and at the same time in second network M. On the other hand, nodes B, B', and B" may be partially functional devices.

A node constructed as a fully functional device assumes, per radio network, the special function of the personal area network (PAN) coordinator. The PAN coordinator determines the PAN identifier (PAN ID) that delimits the radio network from other IEEE 802.15.4 radio networks in radio range. Furthermore, it assumes in the so-called slotted mode the synchronization of all network nodes.

In the example embodiment of FIG. 3, node G may also only function in the first radio network N as PAN coordinator or also in both networks N, M as PAN coordinator or in both networks as simply a fully functional device. It is also possible to provide several fully functional devices or exclusively fully functional devices in each radio network N, M (peer-to-peer topology). In order that node G may function as gateway, node G is in transmission range of a node A, A', A" of the first radio network N as well as in transmission range of another node B, B', B" of the second radio network M.

In particular embodiments, node G comprises a transmitting-receiving apparatus 1 and an antenna 800 connected to the transmitting-receiving apparatus 1. Via antenna 800 transmitting-receiving apparatus 1 of node G receives a radio signal $RF_A$ from node A of the first radio network N or a radio signal $RF_B$ from node B of the second radio network M. Furthermore, node G comprises an energy supply unit, not shown in FIG. 3, for example, in the form of a battery, as well as, if necessary, further components, such as sensors, actors, and the like. Node A transmits, for example, a frame in conformity with industry standard IEEE 802.15.4 to node G.

Figure 1:
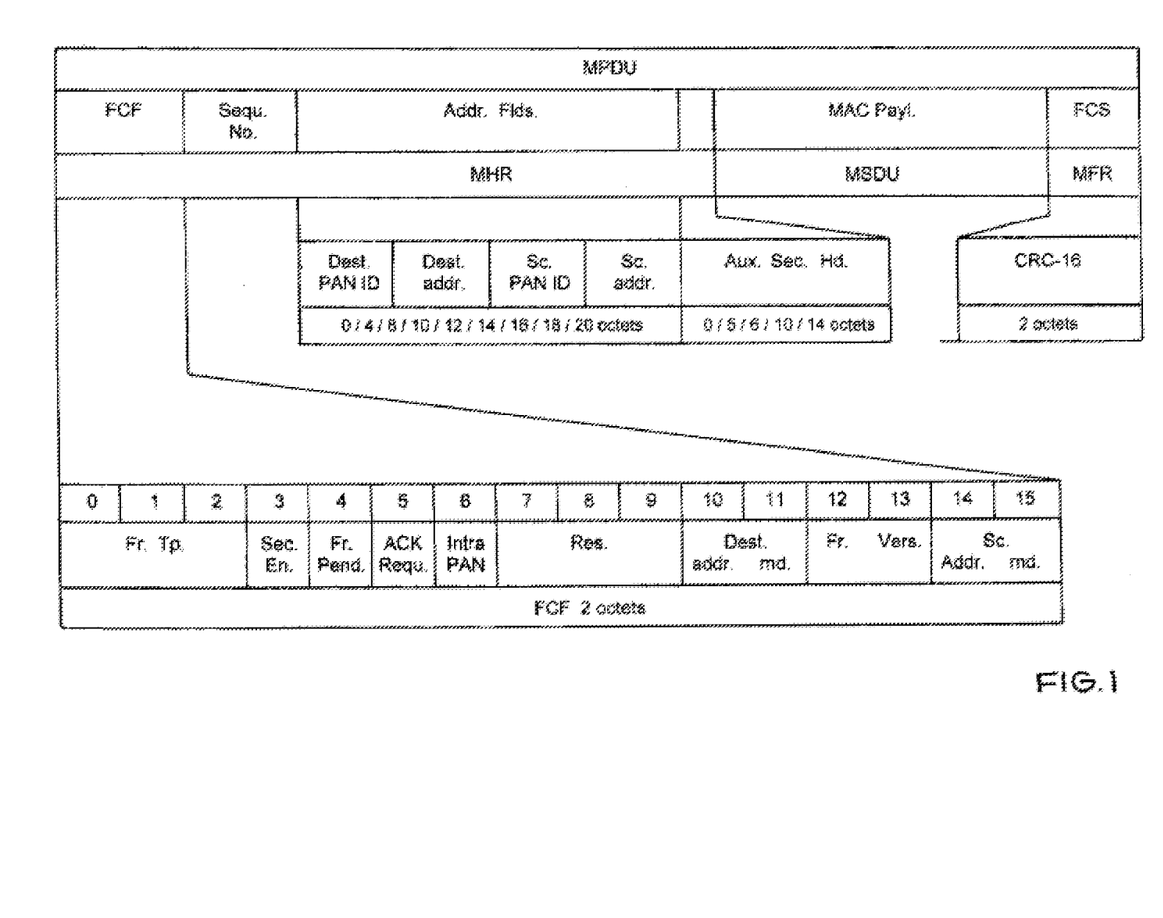
FIG. 1 shows an example medium access control (MAC) frame in accordance with industry standard Institute of Electrical and Electronics Engineers (IEEE) 802.15.4.

For the industry standard IEEE 802.15.4, a frame structure of the MAC layer MAC Protocol Data Unit (MPDU) is schematically shown in FIG. 1. The frame structure comprises control fields, Frame Control Field (FCF) with 16 bits, followed by a sequence number (Sequ. No.), followed by addressing fields (Addr.Flds.), and followed by an optional auxiliary security header (Aux.Sec.Hd.), whereby control fields FCF, sequence number Sequ. No., addressing fields Addr.Flds., and security header Aux.Sec.Hd. form a MAC header (MHR).

The optional security header Aux.Sec.Hd. may be followed by the useful data MAC Service Data Unit (MSDU) of the MAC frame and the end field MAC Footer (MFR) that comprises a checking sequence Frame CheckSum (FCS), for example, as a cyclic redundancy check 16 (CRC-16).

Several address fields Addr.Flds. are provided in the industry standard IEEE 802.15.4. A destination PAN identification address Dest.PAN.ID, a destination address Dest.addr., a source PAN identification address Sc.PAN.ID, and a source address Sc.addr. may be provided. The total length of the address fields Addr.Flds. may be 4, 6, 8, 10, 12, 14, 16, 18, 20 octets or no octet in the case of an acknowledgment message (ACK).

In particular embodiments, the length of the address fields Addr.Flds. and the number of present fields Dest.PAN.ID, Dest.addr., Sc.PAN.ID, or Sc.addr. may be determined by the receiving node using the information contained in control field FCF. In particular embodiments, for example, bit 6 "Intra-PAN" indicates that in a frame in which both the destination address and source address are present, the field Sc.PAN.ID was omitted. The bits 10 and 11 indicate a destination addressing mode (Dest.addr.md), in particular whether the destination PAN identification address Dest.PAN.ID is present and whether the destination address Dest.addr. contains a 16-bit address (Short Address) or a 64-bit address (Extended Address). Furthermore, control field FCF has further bits with the frame type (Fr.Tp.) 0 to 2, with an indicator Sec.En. (3) for security processes, has a subfield Fr.Pend. for waiting frames, a subfield ACK.Requ. for the request of an ACK message, reserved bits 7 to 9, frame versions (Fr.Vers.) for different versions (2003/2006) of the industry standard IEEE 802.15.4, and has the source address mode (Sc.addr.md.). Bits 0-2, 3, 6, and 10-15 may be input values of a logic for filtering the addresses Dest.PAN.ID, Dest.addr., Sc.PAN.ID, and Sc.addr. in the address fields (Addr.Flds.).

A different control field FCF may be received in the radio signals $RF_A$ and $RF_B$ by node G in the two radio networks N and M in FIG. 3 due to the association of node G with both radio networks N and M.

FIG. 2 schematically shows a transmitting-receiving apparatus 1 in a block diagram. Transmitting-receiving apparatus 1 comprises a transmitting-receiving unit 200. Transmitting-receiving unit 200 comprises analog as well as digital circuits in order to amplify the received radio frequency (RF) signal and others, to transform them into baseband, to despread them, and to forward them to decoder 300 for decoding. Decoder 300 outputs the decoded data $D_{RX}$ with a width of 8 bits. The data $D_{RX}$ is forwarded via interface 600 via the connection 760 to an arithmetic unit 700, for example to a microcontroller (μC), and evaluated by arithmetic unit 700. For transmitting, arithmetic unit 700 initiates an operational sequence in that data $D_{TX}$ to be transmitted is coded by a coder 400 and is transmitted by transmitting-receiving unit 200 via antenna 800.

The check of whether the received data $D_{RX}$ is determined for this node with transmitting-receiving apparatus 1 of FIG. 2 is established by an address filter unit 100. Address filter unit 100 has an input 101. The data $D_{RX}$ generated by decoding from received RF signal is on input 101 of address filter unit 100.

Address filter unit 100 comprises a first address filter 110 for comparing an address contained in data $D_{RX}$, which address is defined by address fields Addr.Flds. according to FIG. 1, with a first comparison address (Addr1). In particular embodiments, address filter unit 100 comprises a second address filter 120 for comparing the address contained in data $D_{RX}$ with a second comparison address (Addr2.).

Address filter unit 100 furthermore comprises a control unit 150. Inputs 111, 121, 151 of control unit 150, of the first address filter 110 and of the second address filter 124 are connected to input 101 of address filter unit 100, so that data $D_{RX}$ is on control unit 150, on the first address filter 110, and on the second address filter 120. As a result of this interconnection of the first address filter 110 and of the second address filter 120, a simultaneous comparison of the address (Addr.Flds.) contained in the data $D_{RX}$ with the first comparison address Addr1 and with the second comparison address Addr2 may be carried out. The first address filter 110 and the second address filter 120 may be constructed to this end, for example, as a digital comparator. In particular embodiments, a third address filter 130 and a fourth address filter 140 are shown in the example embodiment of FIG. 2 whose inputs 131, 141 are also connected to input 101 of address filter unit 100 so that the address (Addr.Flds.) contained in data $D_{RX}$ may be simultaneously compared with four comparison addresses Addr1, Addr2, Addr3, Addr4 by means of address filter unit 100.

Control unit 150 is adjusted for controlling the comparison by the address filters 110, 120, 130, 140. The comparison by address filters 110, 120, 130, 140 is controlled here using the bits of control field FCF. To this end control field FCF is determined by control unit 150 from data $D_{RX}$ and evaluated. For example, according to FIG. 1 bits 0-2, 3, 6, and 10-15 serve as input values for a logic of control unit 150 that outputs control signals associated with the input values for filtering the addresses Dest.PAN.ID, Dest.addr., Sc.PAN.ID, and Sc.addr. in the address fields Addr.Flds. to a first control input 112 of the first address filter 110, to a second control input 122 of the second address filter 120, to a third control input 132 of the third address filter 130, and to a fourth control input 142 of the fourth address filter 140. Using the control signals, the bits of data $D_{RX}$ to be compared are determined in address filters 110, 120, 130, 140.

In particular embodiments, transmitting-receiving apparatus 1 comprises a configuration register 160 that is connected to a first configuration input 113 of the first address filter 110, to a second configuration input 123 of the second address filter 120, to a third configuration input 133 of the third address filter 130, and to a fourth configuration input 143 of the fourth address filter 140. The first comparison address Addr1, the second comparison address Addr2, the third comparison address Addr3, and the fourth comparison address Addr3 may be determined by configuration register 160. For example, the comparison addresses Addr1, Addr2, Addr3 and Addr4 are stored in configuration register 160. Configuration register 160 is connected to address filters 110, 120, 130, 140, for example, by a bus.

In particular embodiments, other configuration settings may be stored in configuration register 160. Configuration register 160 may be adjusted for individually activating and deactivating the function of each address filter 110, 120, 130, 140. The particular address filter 110, 120, 130, 140 is cut in and out by an appropriate activation bit. As a result, the current consumption for address filters not required in the concrete application may be reduced. In particular embodiments, two address filters, such as 130 and 140, could be associated with the same comparison address Addr3=Addr4, where only the address filter 130 with a higher priority carries out the comparison.

Configuration register 160 may be adjusted for storing an identification character for whether transmitting-receiving apparatus 1 functions as PAN coordinator for the associated comparison address Addr1, Addr2, Addr3, or Addr4. Transmitting-receiving apparatus 1 may be configured here for each radio network M, N optionally as a PAN coordinator by the storing of the identification character in configuration register 160. Transmitting-receiving apparatus 1 may be used here simultaneously as coordinator for several radio networks.

In particular embodiments, configuration register 160 may be adjusted for individually storing a data display bit for each comparison address Addr1, Addr2, Addr3, or Addr4, where the data display bit indicates whether transmitting-receiving apparatus 1 holds data to be transmitted that should be transmitted in the associated radio network M, N. In particular embodiments, for example, data may be stored in a waiting register that is to be transmitted to a node in first radio network N. In this case the associated data display bit is set.

Configuration register 160 is connected for adjustment to arithmetic unit 700 via interface 600. Interface 600 may be adjusted for making possible a programming of configuration register 160 by arithmetic unit 700 via connection 760, for example a Serial Peripheral Interface (SPI) connection. Also, values may be read out of configuration register 160 via interface 600 by arithmetic unit 700.

Transmitting-receiving apparatus 1 comprises a status unit 170 that is connected to outputs 114, 124, 134, 144 of address filters 110, 120, 130, 140. Status unit 170 may be adjusted for generating a status signal FSt using the comparison by address filters 110, 120, 130, 140. Status symbol FSt is added by status unit 170 to data $D_{RX}$. In particular embodiments, for example, status signal FSt makes it possible for arithmetic unit 700 to determine for which comparison address Addr1, Addr2, Addr3, Addr4 the frame in data $D_{RX}$ was received without arithmetic unit 700 having to reevaluate data $D_{RX}$.

In the example embodiment of FIG. 2, status unit 170 may additionally generate an interrupt signal IRQ. For example, interface 600 may be adjusted for waking up arithmetic unit 700 using interrupt signal IRQ from a quiet mode with low current consumption into a normal mode. In particular embodiments, status unit 170 may generate a specific interrupt signal IRQ for each address filter 110, 120, 130, 140, so that a jump may be made for the particular comparison address Addr1, Addr2, Addr3, Addr4 into an associated section of a program in arithmetic unit 700.

In the example embodiment of FIG. 2, transmitting-receiving apparatus 1 comprises a logic 500 for generating an ACK message that is generated by transmitting-receiving apparatus 1 without interaction with arithmetic unit 700 upon request (bit 5 of the FCF). For example, node A transmits a frame and requests the sending back of an ACK message. In order to generate the ACK message, logic 500 may be connected to address filter unit 100. The sequence number Sequ.No. determined from the received data $D_{RX}$ is outputted to logic 500 by control unit 150. Status signal FSt associated with the determined comparison address Addr1, Addr2, Addr3, and Addr4 is outputted to logic 500 by status unit 170. The associated data display bit of the subfield Frame Pending (Fr.Pend.) for waiting frames may be outputted to logic 500 from configuration register 160 using the status signal FSt. The ACK message is composed from the sequence number Sequ.No. and the data display bit for the subfield Fr.Pend. by logic 500. The generated ACK message is therefore transmitted without interaction with arithmetic unit 700 by coder 400 and transmitting-receiving unit 200 via antenna 800 to node A requesting the ACK message.

Figure 4A:
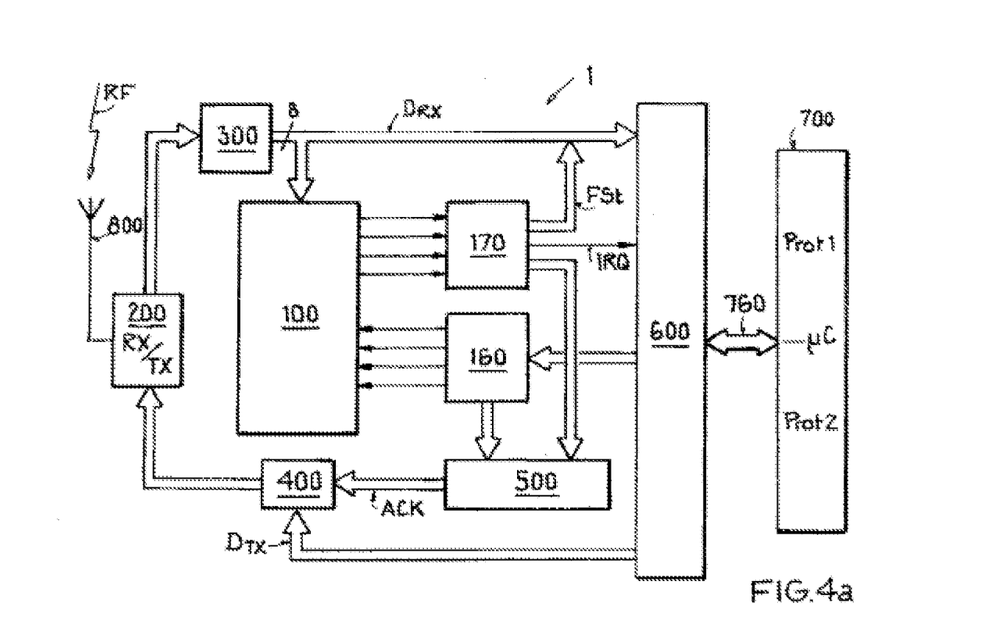
FIG. 4a shows an example schematic representation of a second transmitting-receiving apparatus.
Figure 4B:
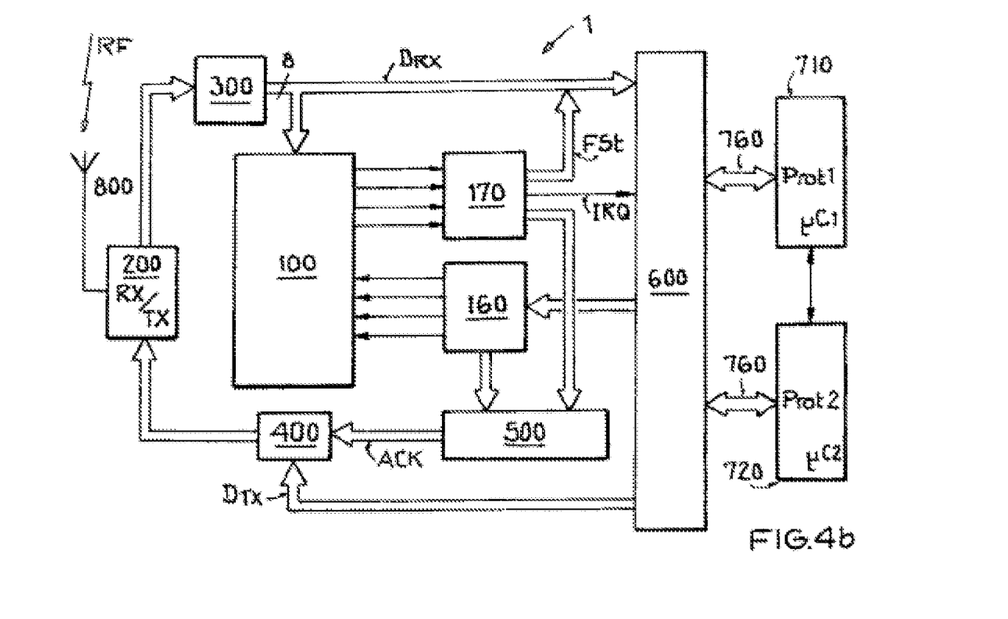
FIG. 4b shows an example schematic representation of a third transmitting-receiving apparatus.

FIGS. 4a and 4b show two example embodiments with a transmitting-receiving apparatus 1. Transmitting-receiving apparatus 1 of FIG. 4a comprises a transmitting-receiving unit 200 connected to an antenna 800, which unit 200 is connected to a decoder 300. Data $D_{RX}$ passes via interface 600 to arithmetic unit 700. In particular embodiments, arithmetic unit 700 of FIGS. 4a and 4b, in contrast to FIG. 2, may be adjusted for carrying out two different protocols Prot1 and Prot2. Each protocol Prot1 and Prot2 is associated with its own comparison address Addr1, Addr2. In particular embodiments, for example, in a point-to-point connection between two nodes the first protocol Prot1 with the first comparison address serves for an unencrypted standard communication. In particular embodiments, the second protocol Prot2 with the second comparison address Addr2 serves for an encrypted communication. The two different protocols Prot1, Prot2 may also differ in other functions, for example, in a transmission rate. Consequently, the first protocol Prot1 and the second protocol Prot2 may differ by different functions in at least one layer. Consequently, transmitting-receiving apparatus 1 may be adjusted for receiving frames of the first protocol Prot1 as well as of the second protocol Prot2. The decision about which protocol Prot1, Prot2 data $D_{RX}$ is associated with is decided by the address comparison. The same format of the addresses is used in both protocols Prot1, Prot1. The format of the address fields Addr.Flds. conforms, in particular, to the industry standard IEEE 802.15.4.

In particular embodiments, for example, all nodes that use the first protocol Prot1 may communicate with one another in the radio network. Also, all nodes that use the second protocol Prot2 may communicate with each other and radio network N. In particular embodiments, individual or all nodes may use the first protocol Prot1 as well as the second protocol Prot2. All nodes of radio network N transmit and receive on the same frequency channel. Consequently, all nodes belong to the same radio network N but may use different protocols Prot1, Prot2 at the same time. In the example embodiment of FIG. 4a both protocols Prot1 and Prot2 may be completely separated in arithmetic unit 700. Both protocols Prot1 and Prot2 may fall back on transmitting-receiving apparatus 1 as a resource for transmitting data in radio network N.

A combination of the example embodiments of FIG. 2 and FIG. 4a is also possible. In particular embodiments, the address Addr.Flds. contained in data $D_{RX}$ is compared with a third comparison address Addr3 by transmitting-receiving apparatus 1. Based on the comparison of the address Addr.Flds. contained in data $D_{RX}$ with the first comparison address Addr1, the second comparison address Addr2, and the third comparison address Addr3, a status signal FSt is generated by status unit 170 of transmitting-receiving apparatus 1. The third comparison address Addr3 may be associated with a second radio network M different from the first radio network N. Thus, the node with transmitting-receiving apparatus 1 may receive frames of the first protocol Prot1 of the first radio network as well as of the second protocol Prot2 of the first radio network N and may also receive frames of the second radio network M.

FIG. 4b shows two arithmetic units 710, 720 as microcontrollers μC1, μC2 that are connected via the connection 760 to the interface 600 of transmitting-receiving apparatus 1 and may therefore share a radio network N. The first arithmetic unit 710 uses the first protocol Prot1 and the second arithmetic unit 720 uses the second protocol Prot2. Certain data of the first arithmetic unit 710 may be transmitted by the first comparison address Addr1 for the first arithmetic unit 710. Certain data of the second arithmetic unit 720 may be transmitted by the second comparison address Addr2 for the second arithmetic unit 720. The first arithmetic unit 710 and the second arithmetic unit 720 may interact for the coordination of a data transmitter.

This disclosure is not limited to the embodiments shown in FIGS. 1 to 4b. For example, it is possible to provide a different number of, for example, three or five address filters. The address filtering is especially suited for a radio network in accordance with the industry standard IEEE 802.15.4 on account of the low data traffic. In particular embodiments, it is also possible to provide the address filtering for another industry standard for a radio network, such as the IEEE 802.15.1 standard.

The following is a list of reference symbols and numbers in FIGS. 1 to 4b, provided for example illustration purposes only and not by way of limitation:
1 Transmitting-receiving apparatus
100 Address filter unit
101, 111, 121, 131, 141 Input
110, 120, 130, 140 Address filter
112, 122, 132, 143 Control input
113, 123, 133, 143 Input, comparison address input
114, 142, 134, 144 Output
150 Control unit
160 Configuration register
170 Status unit
200, RX/TX Transmitting-receiving unit
300 Decoder
400 Coder
500 Logic
600 Interface
700, μC Arithmetic unit, microcontroller
760 Connection
800 Antenna
A, A', A'', B, B', B'', G Nodes
M, N Radio network
ACK Acknowledgment message, acknowledgment
RF, $RF_A$, $RF_B$ Radio signal
Addr1, Addr2, Addr3, Addr4 Comparison address
$D_{RX}$, $D_{TX}$ Data
IRQ Interrupt signal
FSt Status signal Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. A method comprising, by a transceiver:
receiving a first radio frequency (RF) signal from a first node;
generating a first digital data set by decoding the first received RF signal;
determining whether a first address in the first digital data set is associated with at least one of a first radio network or a second radio network by comparing the first address to a first set of addresses associated with the first radio network and a second set of addresses associated with the second radio network;
appending a first status to the first digital data set indicating that the first address is associated with at least one of the first radio network or the second radio network; and
transmitting an interrupt signal and the first digital data set to a microcontroller for evaluation by the microcontroller in response to determining that the first address is associated with at least one of the first radio network or the second radio network.

2. The method of claim 1, further comprising, in response to transmitting the interrupt signal and the first digital data set to the microcontroller, transmitting an acknowledgement message to the first node in response to a request from the first node.

3. The method of claim 1, further comprising:
receiving a second RF signal from the first node;
generating a second digital data set by decoding the second received RF signal;
determining whether a second address in the second digital data set is associated with at least one of the first radio network or the second radio network by comparing the second address to the first and second sets of addresses, each address in the first set of addresses associated with one of a first protocol or a second protocol:
appending a second status to the second digital data set indicating that the second address is associated with at least one of the first radio network or the second radio network with which the second address in the digital data set is determined to be associated; and
transmitting an interrupt signal and the second digital data set to a microcontroller for evaluation by the microcontroller in response to determining that the second address is associated with at least one of the first radio network or the second radio network with which the second address in the digital data set is determined to be associated.

4. The method of claim 1, wherein the interrupt signal causes the microcontroller to exit an energy saving mode and the interrupt signal is specific to one of the first or second sets of addresses to reduce processing time of the microcontroller.

5. The method of claim 1, wherein each address in the first set of addresses is associated with one of a first protocol or a second protocol in the first network, the first and second protocols functioning on different protocol layers in the Open Systems Interconnection model (OSI model).

6. The method of claim 5, wherein the first and second protocols each specifies a different data transmission rate.

7. The method of claim 5, wherein the first protocol is unencrypted and the second protocol is encrypted.

8. A device comprising:
a transceiver configured to:
receive a first radio frequency (RF) signal from a first node;
generate a first digital data set by decoding the first received RF signal;
determine whether a first address in the first digital data set is associated with at least one of a first radio network or a second radio network by comparing the first address to a first set of addresses associated with the first radio network and a second set of addresses associated with the second radio network;
append a first status to the first digital data set indicating that the first address is associated with at least one of the first radio network or the second radio network; and
transmit an interrupt signal and the first digital data set to a microcontroller for evaluation by the microcontroller in response to determining that the first address is associated with at least one of the first radio network or the second radio network.

9. The device of claim 8, the transceiver further configured to, in response to transmitting the interrupt signal and the first digital data set to the microcontroller, transmit an acknowledgement message to the first node in response to a request from the first node.

10. The device of claim 8, the transceiver further configured to:
receive a second RF signal from the first node;
generate a second digital data set by decoding the second received RF signal;
determine whether a second address in the second digital data set is associated with at least one of the first radio network or the second radio network by comparing the second address to the first and second sets of addresses, each address in the first set of addresses associated with one of a first protocol or second protocol;
append a second status to the second digital data set indicating that the second address is associated with at least one of the first radio network or the second radio network with which the second address in the digital data set is determined to be associated; and
transmit an interrupt signal and the second digital data set to a microcontroller for evaluation by the microcontroller in response to determining that the second address is associated with at least one of the first radio network or the second radio network with which the second address in the digital data set is determined to be associated.

11. The device of claim 8, wherein the interrupt signal causes the microcontroller to exit an energy saving mode and the interrupt signal is specific to one of the first or second sets of addresses to reduce processing time of the microcontroller.

12. The device of claim 8, wherein each address in the first set of addresses is associated with one of a first protocol or a second protocol in the first network, the first and second protocols functioning on different protocol layers in the Open Systems Interconnection model (OSI model).

13. The device of claim 12, wherein the first and second protocols each specifies a different data transmission rate.

14. The device of claim 12, wherein the first protocol is unencrypted and the second protocol is encrypted.

15. A system comprising:
an antenna configured to receive a first radio frequency (RF) signal from a first node;
a transceiver coupled to the antenna, the transceiver configured to:
receive a first radio frequency (RF) signal from a first node;
generate a first digital data set by decoding the first received RF signal;
determine whether a first address in the first digital data set is associated with at least one of a first radio network or a second radio network by comparing the first address to a first set of addresses associated with the first radio network and a second set of addresses associated with the second radio network;
append a first status to the first digital data set indicating that the first address is associated with at least one of the first radio network or the second radio network; and
transmit an interrupt signal and the first digital data set to a microcontroller for evaluation by the microcontroller in response to determining that the first address is associated with at least one of the first radio network or the second radio network; and
the microcontroller coupled to the transceiver by a digital interface and configured to receive and evaluate the first digital data set.

16. The system of claim 15, the transceiver further configured to, in response to transmitting the interrupt signal and the first digital data set to the microcontroller, transmit an acknowledgement message to the first node in response to a request from the first node.

17. The system of claim 15, wherein the interrupt signal causes the microcontroller to exit an energy saving mode and the interrupt signal is specific to one of the first or second sets of addresses to reduce processing time of the microcontroller.

18. The system of claim 15, wherein each address in the first set of addresses is associated with one of a first protocol or a second protocol in the first network, the first and second protocols functioning on different protocol layers in the Open Systems Interconnection model (OSI model).

19. The system of claim 18, wherein the first and second protocols each specifies a different data transmission rate.

20. The system of claim 18, wherein the first protocol is unencrypted and the second protocol is encrypted.

* * * * *